United States Patent
Gaudig

(10) Patent No.: US 8,020,923 B2
(45) Date of Patent: Sep. 20, 2011

(54) MOTOR VEHICLE WITH A SLIDING DOOR AND AN ADJUSTABLE ARMREST

(75) Inventor: Ralf Gaudig, Ruesselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 219 days.

(21) Appl. No.: 12/541,042

(22) Filed: Aug. 13, 2009

(65) Prior Publication Data

US 2010/0045068 A1  Feb. 25, 2010

(30) Foreign Application Priority Data

Aug. 25, 2008  (DE) .................. 10 2008 039 608

(51) Int. Cl.
*B60J 9/00* (2006.01)
(52) U.S. Cl. .................................... 296/153
(58) Field of Classification Search .......... 296/153, 296/146.1, 146.11, 146.12, 146.4, 155, 202, 296/24.34, 37.8; 49/213, 360; 292/216; 297/411.32
See application file for complete search history.

(56) References Cited

U.S. PATENT DOCUMENTS

| | | | |
|---|---|---|---|
| 4,019,775 A * | 4/1977 | Grossbach et al. | 296/155 |
| 4,152,872 A * | 5/1979 | Tanizaki et al. | 49/214 |
| 4,337,596 A * | 7/1982 | Kern et al. | 49/210 |
| 5,876,087 A * | 3/1999 | Kleefeldt et al. | 296/155 |
| 5,964,497 A * | 10/1999 | Wiles | 296/153 |
| 6,145,919 A | 11/2000 | Mysliwiec et al. | |
| 6,328,374 B1 * | 12/2001 | Patel | 296/155 |
| 6,553,719 B1 * | 4/2003 | Stone et al. | 49/358 |
| 7,413,215 B2 * | 8/2008 | Weston et al. | 280/730.2 |
| 7,699,363 B2 * | 4/2010 | Langfermann et al. | 292/216 |
| 7,744,141 B2 * | 6/2010 | Saionji et al. | 296/1.02 |
| 7,810,282 B2 * | 10/2010 | Oxley | 49/362 |
| 2007/0085374 A1* | 4/2007 | Mather et al. | 296/155 |

FOREIGN PATENT DOCUMENTS

| | | |
|---|---|---|
| DE | 10029926 A1 | 1/2002 |
| DE | 10307481 A1 | 9/2004 |
| DE | 102007045491 A1 | 4/2008 |
| EP | 1666302 A1 | 6/2006 |
| FR | 2749233 A1 | 12/1997 |
| FR | 2813565 A1 | 3/2002 |
| FR | 2888785 A1 | 1/2007 |
| FR | 2897306 A1 | 8/2007 |

* cited by examiner

*Primary Examiner* — Kiran B. Patel
(74) *Attorney, Agent, or Firm* — Ingrassia Fisher & Lorenz, P.C.

(57) ABSTRACT

A motor vehicle is provided with a sliding door on which an armrest is provided that protrudes into the vehicle interior. The sliding door can be slid from a closing position, in which an entrance opening in a neighboring vehicle wall is closed, via an intermediate position, in which the sliding door is displaced to the outside relative to the vehicle wall into an opening position, in which the sliding door is arranged in front of an outer side of the vehicle wall and the entrance opening is opened. The armrest is connected with the sliding door in such a manner that the armrest through the sliding of the sliding door from the intermediate position into the opening position is slid in front of an inner side of the vehicle wall.

15 Claims, 2 Drawing Sheets

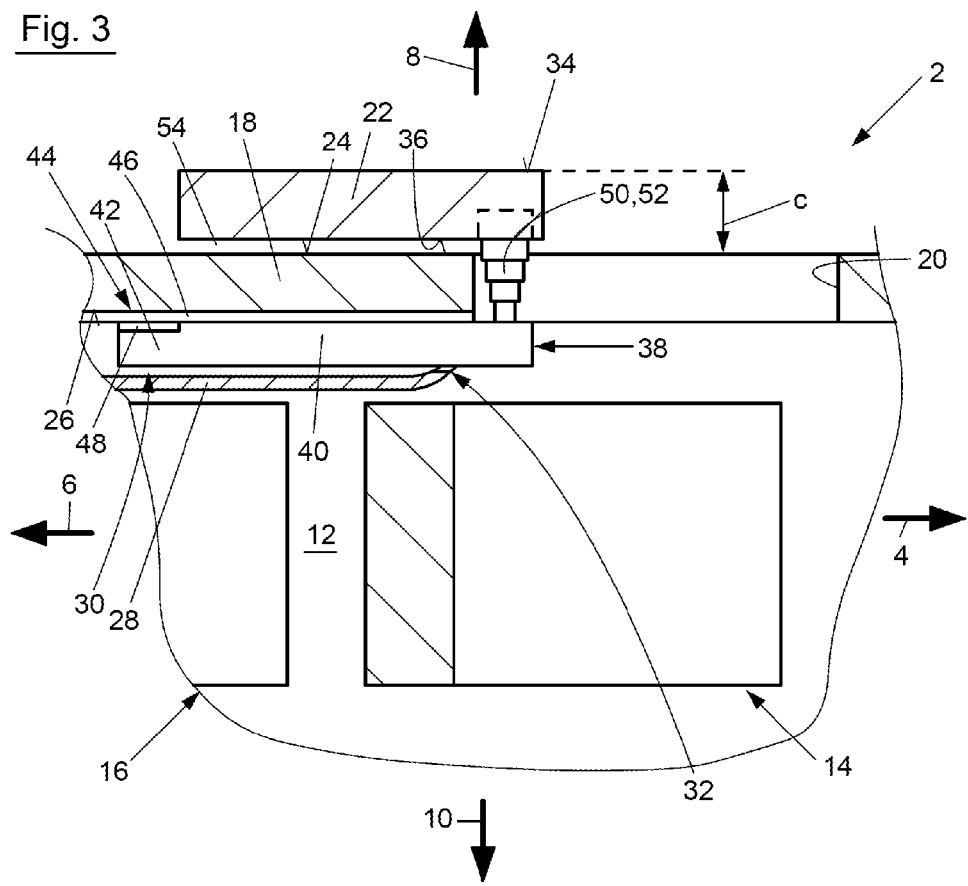

ional transport vehicles having a sliding door are known from the prior art. The sliding

MOTOR VEHICLE WITH A SLIDING DOOR AND AN ADJUSTABLE ARMREST

CROSS-REFERENCE TO RELATED APPLICATION

This application claims priority to German Patent Application No. 102008039608.7, filed Aug. 25, 2008, which is incorporated herein by reference in its entirety.

TECHNICAL FIELD

The present invention relates to a motor vehicle with a sliding door on which an armrest protruding into the vehicle interior is provided. The sliding door from a closing position, in which an entrance opening in a neighboring vehicle wall is closed, can be slid into an opening position via an intermediate position in which the sliding door is displaced to the outside relative to the vehicle wall, in which the sliding door is arranged in front of an outer side of the vehicle wall and the entrance opening is opened.

BACKGROUND

Motor vehicles, more preferably larger transport vehicles having a sliding door are known from the prior art. The sliding door closes an entrance opening in a neighboring or adjoining vehicle wall. In order to open the sliding door it can be slid from the closing position into an opening position via an intermediate position, in which the sliding door is displaced to the outside relative to the vehicle wall, in which the sliding door is arranged in front of an outer side of the vehicle wall, while the entrance opening is opened by the sliding door. As with conventional vehicle doors, an armrest protruding into the vehicle interior is also provided with the known sliding doors on which a vehicle occupant on a vehicle seat associated with the entrance opening can support himself. However, the armrests of the known sliding doors must not protrude particularly far into the vehicle interior so that these as a rule have to be designed very small and comfortable supporting of the vehicle occupant on the armrest is thus not possible. Although a particularly small armrest results in that the sliding door can be slid from the intermediate position without collision, but this is subject to the disadvantage mentioned above. Alternatively the armrests can be designed particularly large and thus protrude particularly far into the vehicle interior but the sliding door would then have to be displaced particularly far to the outside in the intermediate position in order to prevent a collision of the armrest with the neighboring vehicle wall during the sliding from the intermediate position into the opening position. However, a space-saving arrangement of the sliding door in its opening position would be prevented as a result.

It is therefore at least one object of the present invention to create a motor vehicle with a sliding door on which an armrest protruding into the vehicle interior is provided, wherein on the one hand comfortable supporting of the vehicle occupant on the armrest and on the other hand space-saving stowage of the sliding door in its opening position is possible. In addition, other objects, desirable features, and characteristics will become apparent from the subsequent summary and detailed description, and the appended claims, taken in conjunction with the accompanying drawings and this background.

SUMMARY

The motor vehicle according to an embodiment of the invention comprises a sliding door on which an armrest protruding into the vehicle interior is provided. The armrest can for example be arranged on the inside of the sliding door. From a closing position, in which an entrance opening in a neighboring vehicle wall is closed through the sliding door the sliding door can initially be slid to the outside into an intermediate position in which the sliding door is displaced to the outside relative to the vehicle wall. After this the sliding door can be slid from the intermediate position into an opening position. In the opening position the sliding door is arranged in front of an outer side of the vehicle wall while the entrance opening in the vehicle wall is opened. According to an embodiment of the invention the armrest is connected with the sliding door in such a manner that the armrest through sliding of the sliding door from the intermediate position into the opening position in front of an inner side of the vehicle wall.

While with conventional sliding doors the armrest together with the sliding door is arranged in the opening position in front of the outside of the vehicle wall the armrest with the sliding door of the motor vehicle remains in the vehicle interior in a manner of speaking and during the sliding of the sliding door into the opening position is slid in front of the inner side of the vehicle wall. On the one hand this has the advantage that the sliding door does not have to be displaced so far to the outside into the intermediate position in order to be able to subsequently slide the sliding door without collision from the intermediate position into the opening position. This results in that on the one hand a sliding mechanism of a particularly simple construction can be used and on the other hand a particularly space-saving arrangement of the sliding door in its opening position is possible. On the other hand the armrest is still available to the vehicle occupant even when the sliding door is already located in the intermediate position or when it is slid from the intermediate position into the opening position. Thus, a particularly lasting and comfortable utilization of the armrest is possible. In addition to this, the armrest can also be gripped in a particularly simple manner in order to slide the sliding door from the intermediate position into the opening position by exerting a force on the armrest. This makes the handling of the sliding door particularly simple.

In order to reduce the risk of injury which can be posed by an armrest that moves within the vehicle interior an interior covering for the vehicle wall is provided in a preferred embodiment of the motor vehicle according to an embodiment of the invention which, subject to the formation of an intermediate space between the inner side of the vehicle wall and the inner covering, wherein the armrest through the sliding of the sliding door from the intermediate position into the opening position can be brought into the intermediate space. The armrest moving in the sliding direction of the sliding door is thus screened relative to the vehicle occupant through the inner covering so that there is no longer any risk of injury for the vehicle occupant. That the armrest can be brought into the intermediate space through the sliding of the sliding door from the intermediate position into the opening position does not exclude that the armrest is already partly brought into the intermediate space even before the sliding from the intermediate position into the opening position. On the contrary, the last mentioned embodiment is preferred as will be explained in more detail later on.

In a further preferred embodiment of the motor vehicle according to the invention the armrest is at least partially spaced from the sliding door subject to the formation of an intermediate space between an inner side of the sliding door and the armrest. The vehicle wall can be brought into the intermediate space through the sliding of the sliding door from the intermediate position into the opening position. As the term "partially" establishes, only a rest section of the armrest can be spaced from the inner side of the sliding door in order to form the intermediate space. This intermediate space however need not necessarily be permanently present, it is on the contrary preferred if this spacing or the intermediate space exists only part of the time namely for example when the sliding door is slid from the intermediate position into the opening position in order to be able to bring the vehicle wall into the intermediate space.

With the motor vehicle according to an embodiment of the invention it is possible in principle to arrange the armrest immovably on the sliding door so that the armrest traces any sliding movement whatsoever of the sliding door. However, under certain conditions this would also mean that the armrest would have to extend very far into the vehicle interior in order to still be arranged in front of the inner side of the vehicle wall in the opening position of the sliding door. However, an armrest that protrudes particularly far into the vehicle interior can constitute a substantial restriction of the freedom of movement of the vehicle occupant. In order to avoid this, the spacing between the armrest and the inner side of the sliding door can be changed in a particularly preferred embodiment of the invention.

In order for the change of the spacing between the armrest and the inner side of the sliding door commences not later than when the sliding door is slid, the spacing between the armrest and the inner side of the sliding door in a further particularly preferred embodiment of the motor vehicle according to the invention is automatically changed by sliding the sliding door between the closing position and the intermediate position. Thus the freedom of movement of the vehicle occupants during the sliding of the sliding door between the closing position and the intermediate position is not restricted through the armrest since the armrest can remain in its intended place within the motor vehicle. In addition to this, the vehicle occupant need not manually adjust the armrest in order to create the spacing necessary for the sliding of the sliding door from the intermediate position into the opening position, but the spacing changes automatically during the sliding of the sliding door from the closing position into the intermediate position. The handling of the sliding door is substantially simplified as a result.

In an advantageous embodiment of the motor vehicle according to the invention the spacing between the armrest and the inner side of the sliding door can be enlarged by sliding the sliding door from the closing position into the intermediate position and reduced by sliding the sliding door from the intermediate position into the closing position. As already mentioned earlier, the positioning of the armrest within the vehicle interior can be retained as a result without restricting the freedom of movement of the vehicle occupant. It is rather possible for the vehicle occupant to continue to support himself on the armrest both in the closing position as well as in the intermediate position of the sliding door without the vehicle occupant having to follow a movement of the armrest or to lean outward.

In a further advantageous embodiment of the motor vehicle according to the invention a transverse guide is provided via which the armrest is connected with the sliding door transversably slideable relative to the sliding door. The transverse direction here designates the sliding direction of the sliding door during the sliding of the sliding door from the closing position into the intermediate position or vice versa. With this embodiment it is preferred if the transverse guide is designed as a linear guide.

In order to make possible a particularly space-saving arrangement of the transverse guide the transverse guide in a particularly advantageous embodiment of the motor vehicle according to the invention is designed telescope-like. A transverse guide designed telescope-like has a particular advantage here since relatively little space is available in a sliding door, more preferably if a lowerable windowpane has to be arranged in the sliding door.

In a further advantageous embodiment of the motor vehicle according to the invention the armrest comprises a first rest section spaced from the inner side of the sliding door and preferentially extending in longitudinal direction with a free end. The free end through sliding of the sliding door from the intermediate position into the opening position can be slid in front of the inner side of the vehicle wall, preferentially be brought into the intermediate space between the inner side of the vehicle wall and the inner covering. As already mentioned earlier, this embodiment does not exclude that the free end even in the closing or intermediate position of the sliding door is slid in front of the inner side of the vehicle wall or brought into the intermediate space. On the contrary, this embodiment is preferred as will be explained in more detail later on.

Here, longitudinal direction in terms of this embodiment means the sliding direction of the sliding door in which the sliding door during the sliding from the intermediate position into the opening position or the other way round. Since the free end of the first rest section in an alternative of this embodiment during the sliding of the sliding door from the intermediate position into the opening position is brought or further brought into the intermediate space, the free end is covered by the inner covering so that the risk of injury for the vehicle occupants during the moving of the armrest is reduced.

In order to achieve a particularly simple construction of the armrest the armrest in a further advantageous embodiment of the motor vehicle according to the invention furthermore comprises a second rest section which is preferentially connected in an L-shaped manner with the end of the first rest section facing away from the free end. Here it is particularly preferred if the second rest section forms at least one part of the transverse guide if not the entire transverse guide between the first rest section on the one hand and the sliding door on the other hand.

As already indicated previously, the intermediate space between the armrest on the one hand and the inner side of the sliding door on the other hand need not be embodied permanently. On the contrary, this intermediate space is only required when the sliding door is slid from the intermediate position into the opening position so that the vehicle wall can be brought into this intermediate space. For this reason the first rest section in a further preferred embodiment of the motor vehicle according to the invention rests against the inner side of the sliding door in the closing position of the sliding door. It can also be said that the spacing between the first rest section and the inner side of the sliding door in the closing position of said sliding door is equal to zero. This has the particular advantage that the armrest in the closing position of the sliding door can be equally used as a support for utensils without the risk that the utensils fall through a gap between the first rest section and the inner side of the sliding door. In addition to this there is no risk whatsoever that the fingers of the vehicle occupant are trapped in such a gap when the sliding door is in the closing position.

As already mentioned before, the armrest can already be arranged in front of the inner side of the vehicle wall or within the intermediate space between the inner side of the vehicle wall and the inner covering in the closing or intermediate position of the sliding door. In this way the sliding door in a further particularly preferred embodiment of the motor vehicle according to the invention can be slid in transverse direction from the closing position into the intermediate position, wherein the armrest, preferentially the first rest section, particularly preferably the free end of the first rest section, is supported or can be supported on the inner side of the vehicle wall. Because of this supporting of the armrest on the inner side of the vehicle wall even in the closing position of the sliding door it is ensured in a particularly simple manner that the spacing between the armrest on the one hand and the inner side of the sliding door on the other hand changes automatically when the sliding door is slid from the closing position into the intermediate position. In the opposite case, i.e., when the sliding door is slid in transverse direction from the intermediate position into the closing position it should also be ensured that the spacing between the armrest and the inner side of the sliding door changes. This could likewise take place through the supporting or supportability on the inside of the vehicle wall. Alternatively, in this case, supporting of the armrest in transverse direction on the already previously mentioned inner covering would also be possible.

In order to make possible particularly safe sliding of the armrest in front of the inner side of the vehicle wall or into the intermediate space between the inner side of the vehicle wall and the inner covering without the armrest striking the vehicle wall or the inner covering, the armrest in a further particularly preferred embodiment of the motor vehicle according to the invention is supported or can be supported via a longitudinal guide, preferentially a linear guide, between the armrest and the inner side of the vehicle wall. The armrest through sliding of the sliding door from the intermediate position into the opening position and conversely along the longitudinal guide in longitudinal direction. Here, the longitudinal guide should preferentially prevent transverse sliding of the armrest in relation to the vehicle wall in order to safely achieve the previously mentioned advantages.

In a further advantageous embodiment of the motor vehicle according to the invention the longitudinal direction of the sliding door or the entrance opening corresponds to the longitudinal direction of the motor vehicle, while the transverse direction of the sliding door or the entrance opening corresponds to the transverse direction of the motor vehicle.

According to a further advantageous embodiment of the motor vehicle according to the invention a vehicle seat assigned to the entrance opening is arranged in the vehicle interior, wherein the spacing between the armrest and the vehicle seat in the closing position and the intermediate position is equal, provided that the vehicle seat itself was not displaced within the vehicle interior.

BRIEF DESCRIPTION OF THE DRAWINGS

The present invention will hereinafter be described in conjunction with the following drawing figures, wherein like numerals denote like elements, and:

FIG. 3 is the motor vehicle from FIG. 2 with the sliding door in the opening position.

DETAILED DESCRIPTION

The following detailed description is merely exemplary in nature and is not intended to limit application and uses. Furthermore, there is no intention to be bound by any theory presented in the preceding summary and background or the following detailed description.

Figure 1:
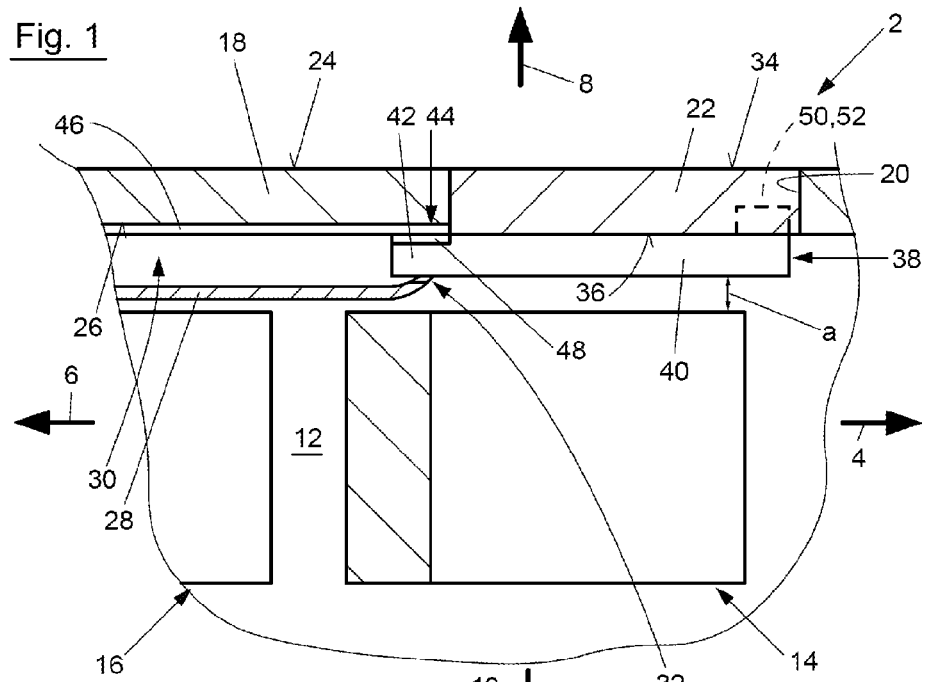
FIG. 1 is a partial top view of an embodiment of the motor vehicle according to the invention with the sliding door in the closing position in sectional representation.

FIG. 1 shows an embodiment of the motor vehicle 2 according to the invention partially in top view. The two opposing longitudinal directions 4, 6 of the motor vehicle 2 are indicated by means of arrows. The longitudinal direction 4 corresponds to the forward direction of the motor vehicle 2, while the longitudinal direction 6 corresponds to the reverse direction of the motor vehicle 2. In addition to this, the two opposing transverse directions 8, 10 of the motor vehicle 2 are indicated by means of corresponding arrows.

The motor vehicle 2 has a vehicle interior 12 in which a plurality of vehicle seats 14, 16 are arranged. In transverse direction 8 the vehicle interior 12 is limited by a fixed vehicle wall 18. In the vehicle wall 18 an entrance opening 20 is formed which can be closed through a sliding door 22. The entrance opening 20 in FIG. 1 is closed through the sliding door 22. The vehicle wall 18 furthermore comprises an outer side 24 facing away from the vehicle interior 12, facing in transverse direction 8 and an inner side 26 facing the vehicle interior 12, and facing in transverse direction 10. In longitudinal direction 6 behind the entrance opening 20 an interior covering 28 for the vehicle wall 18 is additionally provided. The interior covering 28, which is preferentially designed flat, here extends from the inner side 26 of the vehicle wall 18 in such a manner, that an intermediate space 30 between the inner side 26 of the vehicle wall 18 and the covering 28 is formed. Thanks to the covering 28 the intermediate space 30 is substantially inaccessible from the vehicle interior 12, but an opening 32 is provided in the interior covering 28 at the end facing in longitudinal direction 4, the function of which will be explained in more detail later on.

The sliding door 22 has an outer side 34 facing away from the vehicle interior 12 facing in transverse direction 8 and an inner side 36 facing the vehicle interior 12 facing in transverse direction 10. In FIG. 1 the sliding door 22 is in a closing position in which the entrance opening 20 in the neighboring vehicle wall 18 is closed through the sliding door 22. In the closing position the outer side 34 of the sliding door 22 is arranged flush with the outer side 24 of the vehicle wall 18. The sliding door 22 has two opposing transverse directions which substantially extend in direction of the surface normal of the outer and inner side 34, 36 and two opposing longitudinal directions, which extend at a right angle to the transverse directions of the sliding door 22 and the transverse directions of the sliding door 22 in the present example correspond to the transverse directions 8, 10 of the motor vehicle 2, while the longitudinal directions of the sliding door 22 correspond to the longitudinal directions 4,6 of the motor vehicle 2.

On the inner side 36 of the sliding door 22, an armrest 38 protruding into the vehicle interior 12 is provided. The armrest 38 comprises a first rest section 40 extending in longitudinal direction 4, 6 which protrudes into the vehicle interior 12 independently of the position of the sliding door 22, so that a vehicle occupant on the vehicle seat 14 associated with the entrance opening 20 or the sliding door 22 with his arm can support himself from the top on the first rest section 40 of the armrest 38.

The first rest section 40 comprises a free end 42 facing in longitudinal direction 6 to the rear. In the closing position of the sliding door 22 the free end 42 already protrudes through the opening 32 in the covering 28 in longitudinal direction 6 into the intermediate space 30. Here, the free end 42 of the armrest 38 is supported on the inner side 26 of the vehicle wall 18 via a longitudinal guide 44. The longitudinal guide 44, which in the present example is designed as linear guide, in principle makes possible sliding of the first rest section 40 relative to the vehicle wall 18 in the longitudinal directions 4, 6 and equally prevents sliding of the first rest section 40 in transverse direction 8 and 10 relative to the vehicle wall 18. Thus the longitudinal guide 44 in the present example is composed of a guide rail 46 on the inner side 26 of the vehicle wall 18 on the one hand and a guide part 48 guided in the guide rail 46 on the free end 42 of the first rest section 40 on the other hand.

The armrest 38 furthermore comprises a second rest section 50. The second rest section 50 is permanently connected with the end of the first rest section 40 facing away from the free end 42 located in longitudinal direction 4, and the second rest section 50 in the top view together with the first rest section 40 is substantially embodied L-shaped. The second rest section 50 in the closing position of the sliding door 22 is entirely arranged within the sliding door 22 as is more preferably evident from FIG. 1. The second rest section 50 here forms a telescope-like transverse guide 52 which preferentially is likewise embodied as linear guide. The telescope-like construction of the transverse guide 52 is more preferably evident from FIG. 2 and FIG. 3. The transverse guide 52 on the one hand makes possible a transverse sliding of the armrest 38 or the first rest section 40 relative to the sliding door 22 in transverse direction 8, 10 and on the other hand brings about driving of the armrests 38 in longitudinal direction 4, 6 when the sliding door 22 is slid in the mentioned longitudinal directions 4, 6 as will be explained in more detail later on.

In the following, the mode of operation of the sliding door 22 as well as additional features of the motor vehicle 2 according to embodiments of the invention will be explained in more detail making reference to FIG. 1 to FIG. 3.

In FIG. 1 the sliding door 22 is in its closing position in which the entrance opening 20 is closed through the sliding door 22. The side of the first rest section 40 of the armrest 38 facing the inner side 36 of the sliding door 22 rests against the inner side 36 of the sliding door 22 when the sliding door 22 is in the closing position shown. The side of the first rest section 40 facing away from the inner side 36 of the sliding door in transverse direction 8, 10 has a spacing a relative to the vehicle seat 14 associated with the entrance opening 20.

Figure 2:
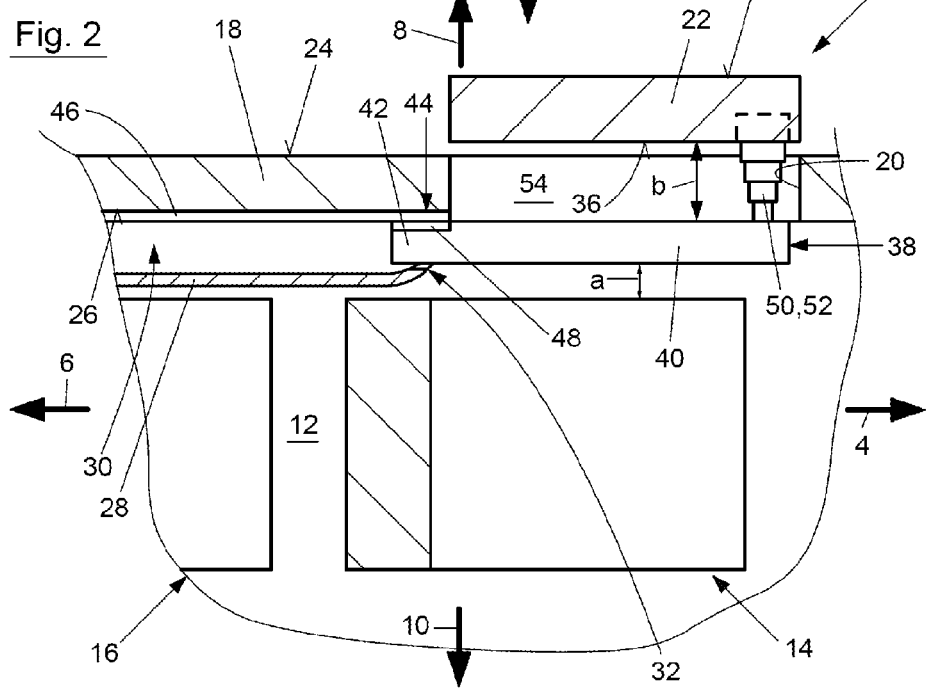
FIG. 2 is the motor vehicle of FIG. 1 with the sliding door in the intermediate position.

If the entrance opening 20 is to be opened, the sliding door 22 can initially be slid to the outside in transverse direction via a sliding mechanism which is not shown in more detail into an intermediate position which is shown in FIG. 2. In the intermediate position the sliding door 22 is displaced to the outside in transverse direction 8 relative to the vehicle wall 18. However, the armrest 38 no longer follows this transverse sliding movement of the sliding door 22 in transverse direction 8. The telescope-like transverse guide 52 on the one hand and the free end 42 of the first rest section 40, which is supported on the inner side 26 of the vehicle wall 18 via the longitudinal guide 44, on the other hand, that the first rest section 40 remains in its original position and is displaced in transverse direction 8, 10 relative to the sliding door 22.

Through the sliding of the sliding door 22 in the intermediate position shown in FIG. 2 is thus created a spacing b in transverse direction 8, 10 between the inner side 36 of the sliding door 22 on the one hand and the first rest section 40 on the other hand, so that an intermediate space 54 between the inner side 36 of the sliding door 22 and the first rest section 40 of the armrest 38 is formed. The spacing b consequently becomes larger automatically through the sliding of the sliding door 22 from the closing position into the intermediate position without the vehicle occupant having to manually slide the armrest 38. This applies also in the opposite case, when the sliding door 22 would be slid back from the intermediate position (FIG. 2) into the closing position (FIG. 1). In the last mentioned case the spacing b would be reduced again until the first rest section 40 in the closing position again adjoins the inner side 36 of the sliding door 22.

As is further evident from FIG. 2, the spacing a between the armrest 38 and the vehicle seat 14 in the intermediate position of the sliding door 22 is of the same size as in the closing position of the sliding door 22. Consequently the vehicle occupant on the vehicle seat 14 can comfortably utilize the armrest 38 even when the sliding door 22 has already been slid to the outside into the intermediate position. In addition to this, the vehicle occupant on the vehicle seat 14 can furthermore easily grip the armrest 38 in order to support the sliding movement of the sliding door 22 from the intermediate position into the opening position described in the following.

In the intermediate position of FIG. 2, the sliding door 22 is displaced in transverse direction 8 to the outside relative to the vehicle wall 18 so far that it can subsequently be slid without colliding in longitudinal direction 6 to the rear into the opening position shown in FIG. 3. As is evident from FIG. 3 the sliding door 22 in the opening position is arranged in front of the outer side 24 of the vehicle wall 18, while the entrance opening 20 is opened. Here, the inner side 36 of the sliding door 22 facing the outer side 24 of the vehicle wall 18 and preferentially arranged parallel to said vehicle wall.

In contrast with the conventional sliding doors the first rest section 40 remains within the vehicle interior 12, and the first rest section 40 of the armrest 38 through sliding of the sliding door 22 from the intermediate position into the opening position along the guide 44 is slid in front of the inner side 26 of the vehicle wall 18 and because of this brought into the intermediate space 30. To be more specific, the free end 42 of the first rest section 40 through the sliding of the sliding door 22 from the intermediate position into the opening position is slid in front of the inner side 26 of the vehicle wall 18 and brought even further into the intermediate space 30, and the covering 28 prevents that the free end 42 strikes a vehicle occupant on the vehicle seat 16 so that the risk of injury is minimized. As part of the sliding movement of the sliding door 22 from the intermediate position into the opening position the vehicle wall 18 furthermore is brought into the intermediate space 54 between the inner side 36 of the sliding door 22 and the first rest section 40.

Since the first rest section 40 does not trace the sliding movement of the sliding door 22 in transverse direction 8 but rather remains in the vehicle interior 12, no components protruding in transverse direction 10 are provided on the inner side 36 of the sliding door 22 any longer, so that the required sliding travel c of the sliding door 22 in transverse direction 8 can be particularly short and sliding of the sliding door 22 from the intermediate position into the opening position without collision is nevertheless possible. In addition to this, the first rest section 40 both in the closing position as well as in the intermediate position can be comfortably used by the vehicle occupant on the vehicle seat 14 without having to lean to the outside in transverse direction 8.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope s as set forth in the appended claims and their legal equivalents.

What is claimed is:

1. A motor vehicle, comprising:
a sliding door; and
an armrest on the sliding door that protrudes into an interior of the motor vehicle,
wherein the sliding door from a closing position, in which an entrance opening in a neighboring vehicle wall is closed, via an intermediate position, in which the sliding door is displaced to the outside relative to the neighboring vehicle wall, can be slid into an opening position in which the sliding door is arranged in front of an outer side of the neighboring vehicle wall and the entrance opening is opened,
wherein the armrest is connected with the sliding door in such a manner that the armrest through sliding of the sliding door from the intermediate position into the opening position can be slid in front of an inner side of the neighboring vehicle wall.

2. The motor vehicle according to claim 1, further comprising an inner covering for the neighboring vehicle wall that is subject to a formation of an intermediate space and arranged between the inner side of the neighboring vehicle wall and the inner covering,
wherein the armrest through sliding of the sliding door from the intermediate position into the opening position can be brought into the intermediate space.

3. The motor vehicle according to claim 1, wherein the armrest at least partially subject to a formation of an intermediate space between the inner side of the sliding door and the armrest is spaced from the sliding door,
wherein the neighboring vehicle wall through sliding of the sliding door from the intermediate position into the opening position can be brought into the intermediate space.

4. The motor vehicle according to claim 3, wherein a spacing between the armrest and the inner side of the sliding door is variable.

5. The motor vehicle according to claim 3, wherein a spacing between the armrest and the inner side of the sliding door is automatically variable through the sliding of the sliding door between the closing position and the intermediate position.

6. The motor vehicle according to claim 3, wherein a spacing between the armrest and the inner side of the sliding door through the sliding of the sliding door from the closing position into the intermediate position can be enlarged and through the sliding of the sliding door from the intermediate position into the closing position can be reduced.

7. The motor vehicle according to claim 4, further comprising a transverse guide in which the armrest is connected with the sliding door and transversely slideable relative to the sliding door.

8. The motor vehicle according to claim 7, wherein the transverse guide is a telescope-like transverse guide.

9. The motor vehicle according to claim 1, wherein the armrest comprises a first rest section spaced from the inner side of the sliding door with a free end,
wherein the free end through the sliding of the sliding door from the intermediate position into the opening position can be slid in front of the inner side of the neighboring vehicle wall.

10. The motor vehicle according to claim 9, wherein the armrest further comprises a second rest section with an end of the first rest section facing away from the free end,
wherein the second rest section forms at least one part of a transverse guide.

11. The motor vehicle according to claim 9, wherein the first rest section in the closing position of the sliding door rests against the inner side of the sliding door.

12. The motor vehicle according to claim 1, wherein the sliding door in a transverse direction can be slid from the closing position in the intermediate position,
wherein the armrest can be supported on the inner side of the neighboring vehicle wall.

13. The motor vehicle according to claim 12, wherein the armrest via a longitudinal guide is adapted for support between the armrest and the inner side of the neighboring vehicle wall,
wherein the armrest through the sliding of the sliding door from the intermediate position into the opening position can be slid along the longitudinal guide in a longitudinal direction.

14. The motor vehicle according to claim 13, wherein the longitudinal direction corresponds to a vehicle longitudinal direction and the transverse direction corresponds to a vehicle transverse direction.

15. The motor vehicle according to claim 1, further comprising a seat associated with the entrance opening;
wherein a spacing between the armrest and the seat is substantially similar in the closing position and the intermediate position.

* * * * *